(12) United States Patent
Kagan et al.

(10) Patent No.: US 8,645,663 B2
(45) Date of Patent: Feb. 4, 2014

(54) NETWORK INTERFACE CONTROLLER WITH FLEXIBLE MEMORY HANDLING

(75) Inventors: Michael Kagan, Zichron Yaakov (IL); Ariel Shahar, Jerusalem (IL); Noam Bloch, Bat Shlomo (IL)

(73) Assignee: Mellanox Technologies Ltd., Yokneam (IL)

( * ) Notice: Subject to any disclaimer, the term of this patent is extended or adjusted under 35 U.S.C. 154(b) by 326 days.

(21) Appl. No.: 13/229,772

(22) Filed: Sep. 12, 2011

(65) Prior Publication Data

US 2013/0067193 A1 Mar. 14, 2013

(51) Int. Cl.
*G06F 12/00* (2006.01)

(52) U.S. Cl.
USPC ............... 711/206; 711/158; 711/203; 710/3; 709/212

(58) Field of Classification Search
USPC ............... 711/206, 158, 203; 710/3; 709/212
See application file for complete search history.

(56) References Cited

U.S. PATENT DOCUMENTS

| | | | |
|---|---|---|---|
| 6,321,276 B1 | 11/2001 | Forin | |
| 6,766,467 B1 | 7/2004 | Neal et al. | |
| 6,789,143 B2 | 9/2004 | Craddock et al. | |
| 6,981,027 B1 | 12/2005 | Gallo et al. | |
| 7,171,484 B1 | 1/2007 | Krause et al. | |
| 7,263,103 B2 | 8/2007 | Kagan et al. | |
| 7,299,266 B2 | 11/2007 | Boyd et al. | |
| 7,464,198 B2 | 12/2008 | Martinez et al. | |
| 7,475,398 B2* | 1/2009 | Nunoe ..................... 718/104 |
| 7,548,999 B2* | 6/2009 | Haertel et al. ................ 710/62 |
| 7,752,417 B2 | 7/2010 | Manczak et al. | |
| 7,809,923 B2 | 10/2010 | Hummel et al. | |
| 8,001,592 B2* | 8/2011 | Hatakeyama ................ 726/17 |
| 8,010,763 B2* | 8/2011 | Armstrong et al. ........... 711/164 |
| 8,051,212 B2 | 11/2011 | Kagan et al. | |
| 8,255,475 B2* | 8/2012 | Kagan et al. .................. 709/212 |
| 8,447,904 B2* | 5/2013 | Riddoch ...................... 710/74 |
| 2002/0152327 A1 | 10/2002 | Kagan et al. | |
| 2003/0046530 A1 | 3/2003 | Poznanovic | |
| 2004/0221128 A1 | 11/2004 | Beecroft et al. | |
| 2004/0230979 A1 | 11/2004 | Beecroft et al. | |
| 2007/0011429 A1* | 1/2007 | Sangili et al. ................. 711/203 |
| 2007/0061492 A1* | 3/2007 | van Riel ........................ 710/3 |
| 2010/0095085 A1* | 4/2010 | Hummel et al. ............. 711/207 |
| 2010/0274876 A1 | 10/2010 | Kagan et al. | |
| 2011/0023027 A1* | 1/2011 | Kegel et al. ..................... 718/1 |

OTHER PUBLICATIONS

Eran et al., U.S. Appl. No. 13/628,155, filed Sep. 27, 2012.

(Continued)

*Primary Examiner* — Stephen Elmore
(74) *Attorney, Agent, or Firm* — D. Kligler IP Services Ltd.

(57) ABSTRACT

An input/output (I/O) device includes a host interface for connection to a host device having a memory, and a network interface, which is configured to transmit and receive, over a network, data packets associated with I/O operations directed to specified virtual addresses in the memory. Processing circuitry is configured to translate the virtual addresses into physical addresses using memory keys provided in conjunction with the I/O operations and to perform the I/O operations by accessing the physical addresses in the memory. At least one of the memory keys is an indirect memory key, which points to multiple direct memory keys, corresponding to multiple respective ranges of the virtual addresses, such that an I/O operation referencing the indirect memory key can cause the processing circuitry to access the memory in at least two of the multiple respective ranges.

22 Claims, 4 Drawing Sheets

(56) References Cited

OTHER PUBLICATIONS

Bloch et al., U.S. Appl. No. 13/628,187, filed Sep. 27, 2012.
Raindel et al., U.S. Appl. No. 13/628,075, filed Sep. 27, 2012.
Solomon R., "I0V 1.1 Update and Overview", LSI Corporation, Member I/O Virtualization Workgroup, PCI-SIG, PCI Express, 45 pages, 2010.
Hummel M., "I0 Memory Management Hardware Goes Mainstream", AMD Fellow, Computation Products Group, Microsoft WinHEC, 7 pages, 2006.
Kagan et al., U.S. Appl. No. 13/665,946, filed Nov. 1, 2012.
Welsh et al., "Incorporating Memory Management into User-Level Network Interfaces", Department of Computer Science, Cornell University, Technical Report TR97-1620, 10 pages, Feb. 13, 1997.
"Linux kernel enable the IOMMU—input/output memory management unit support", Oct. 15, 2007 http://www.cyberciti.biz/tips/howto-turn-on-linux-software-iommu-support.html.
U.S. Appl. No. 12/430,912 Official Action dated Jun. 15, 2011.
U.S. Appl. No. 12/430,912 Official Action dated Nov. 2, 2011.
Infiniband Trade Association, "InfiniBandTM Architecture Specification", vol. 1, Release 1.2.1, Nov. 2007, pp. 1-1727.
U.S. Appl. No. 13/280,457, filed Oct. 25, 2011.
U.S. Appl. No. 13/471,558, filed May 15, 2012.
Shah et al., "Direct Data Placement over Reliable Transports", IETF Network Working Group, RFC 5041, Oct. 2007.
Culley et al., "Marker PDU Aligned Framing for TCP Specification", IETF Network Working Group, RFC 5044, Oct. 2007.
"MPI: A Message-Passing Interface Standard", Version 2.2, Message Passing Interface Forum, Sep. 4, 2009.
U.S. Appl. No. 13/337,178, filed Dec. 26, 2011.

* cited by examiner

NETWORK INTERFACE CONTROLLER WITH FLEXIBLE MEMORY HANDLING

FIELD OF THE INVENTION

The present invention relates generally to computer networks, and specifically to handling of network input/output (I/O) operations.

BACKGROUND

Computer operating systems use virtual memory techniques to permit multiple application programs to run concurrently and to address a contiguous working memory space, even when the corresponding physical (machine) memory space is fragmented and may overflow to disk storage. The virtual memory address space is typically divided into pages, and the computer memory management unit (MMU) uses page tables to translate the virtual addresses of the application program into physical addresses. The virtual address range may exceed the amount of actual physical memory, in which case disk files are used to save virtual memory pages that are not currently active.

I/O devices, such as network interface controllers (NICs), usually use physical memory addresses in order to access host memory, but some virtual memory addressing techniques for I/O have been described in the patent literature. For example, U.S. Patent Application Publication 2010/0274876, whose disclosure is incorporated herein by reference, describes an I/O device, which is configured to receive, over a network, data packets associated with I/O operations directed to specified virtual addresses in the memory. Packet processing hardware in the I/O device is configured to translate the virtual addresses into physical addresses and to perform the I/O operations using the physical addresses. Upon an occurrence of a page fault in translating one of the virtual addresses, the hardware transmits a response packet over the network to a source of the data packets so as to cause the source to refrain from transmitting further data packets while the page fault is serviced.

As another example, U.S. Patent Application Publication 2004/0221128 describes virtual-to-physical memory mapping in network interfaces. Each network interface includes a memory management unit with at least one mapping table for mapping virtual addresses to the physical addresses of the addressable memory of the respective processing node. U.S. Pat. No. 7,299,266 describes memory management offload for RDMA (remote direct memory access) enabled network adapters. A mechanism is provided for implicitly or explicitly registering memory regions, and the hardware is allowed to directly use a region through memory region tables and address translation tables while keeping the region isolated from use by other applications.

InfiniBand™ (IB) is a switched-fabric communications link primarily used in high-performance computing. It has been standardized by the InfiniBand Trade Association. Computing devices (host processors and peripherals) connect to the IB fabric via a network interface controller, which is referred to in IB parlance as a channel adapter. Host processors (or hosts) use a host channel adapter (HCA), while peripheral devices use a target channel adapter (TCA). IB channel adapters implement various service types and transport protocols, including RDMA read and write operations. Details of a hardware-based implementation of IB RDMA are provided, for example, in U.S. Patent Application Publication 2002/0152327, whose disclosure is incorporated herein by reference.

SUMMARY

Embodiments of the present invention that are described hereinbelow provide I/O devices with enhanced host memory handling capabilities and methods for handling host memory access by an I/O device.

There is therefore provided, in accordance with an embodiment of the present invention, an input/output (I/O) device, including a host interface for connection to a host device having a memory, and a network interface, which is configured to transmit and receive, over a network, data packets associated with I/O operations directed to specified virtual addresses in the memory. Processing circuitry is configured to translate the virtual addresses into physical addresses using memory keys provided in conjunction with the I/O operations and to perform the I/O operations by accessing the physical addresses in the memory. At least one of the memory keys is an indirect memory key, which points to multiple direct memory keys, corresponding to multiple respective ranges of the virtual addresses, such that an I/O operation referencing the indirect memory key can cause the processing circuitry to access the memory in at least two of the multiple respective ranges.

Typically, the processing circuitry is configured to translate the virtual addresses into the physical addresses by accessing a translation table using the memory keys.

The multiple respective ranges may be mutually non-contiguous. The I/O operation referencing the indirect memory key may contain a reference to a single contiguous memory segment at a specified address, and the processing circuitry may be configured, using the memory keys, to translate the reference so as to identify and access respective segments of the memory in at least two of the mutually non-contiguous ranges in performing the I/O operation.

The memory keys may include a further indirect memory key, which points to one or more other indirect memory keys.

In a disclosed embodiment, the processing circuitry has multiple work queues, which are respectively assigned to software applications and which include at least one work queue that is configured to receive from a respective software application at least a first work request instructing the I/O device to register a range of virtual addresses in the memory for use in serving the respective software application, and a second work request instructing the I/O device to perform the I/O operation with respect to a specified address in the registered range. The processing circuitry is configured to execute the work requests so as to cause the network interface to transmit and receive over the network data packets associated with the I/O operation.

In one embodiment, the software application is configured to run on a virtual machine in a guest domain on the host device, and the physical addresses belong to the guest domain, and the processing circuitry is configured to translate the physical addresses belonging to the guest domain into machine addresses for use in accessing the memory.

Typically, the processing circuitry is configured to translate the virtual addresses into the physical addresses using a translation table, and the first work request provides a memory key for accessing the translation table. Additionally or alternatively, the processing circuitry is configured to return a completion queue element to the respective software application to indicate that the range of the virtual addresses has been registered in response to the first work request. The I/O operation invoked by the second work request may include a remote direct memory access (RDMA) operation.

In a disclosed embodiment, the direct memory keys are registered on the I/O device by a driver program associated with an operating system on the host device, and the indirect memory keys are registered by software applications.

There is also provided, in accordance with an embodiment of the present invention, a method for communication, which includes coupling an input/output (I/O) device to transmit and receive, over a network, data packets associated with I/O operations directed to specified virtual addresses in a memory of a host device that is coupled to the I/O device. The I/O device receives memory keys, wherein at least one of the memory keys is an indirect memory key, which points to multiple direct memory keys, which are associated with respective ranges of the virtual addresses. The I/O device translates the specified virtual addresses into physical addresses using the memory keys. An I/O operation is performed, referencing the indirect memory key, by accessing the physical addresses in the memory corresponding to at least two of the respective ranges of the virtual addresses that are associated with the direct memory keys that are pointed to by the indirect memory key.

The present invention will be more fully understood from the following detailed description of the embodiments thereof, taken together with the drawings in which:

DETAILED DESCRIPTION OF EMBODIMENTS

Overview

Figure 1:
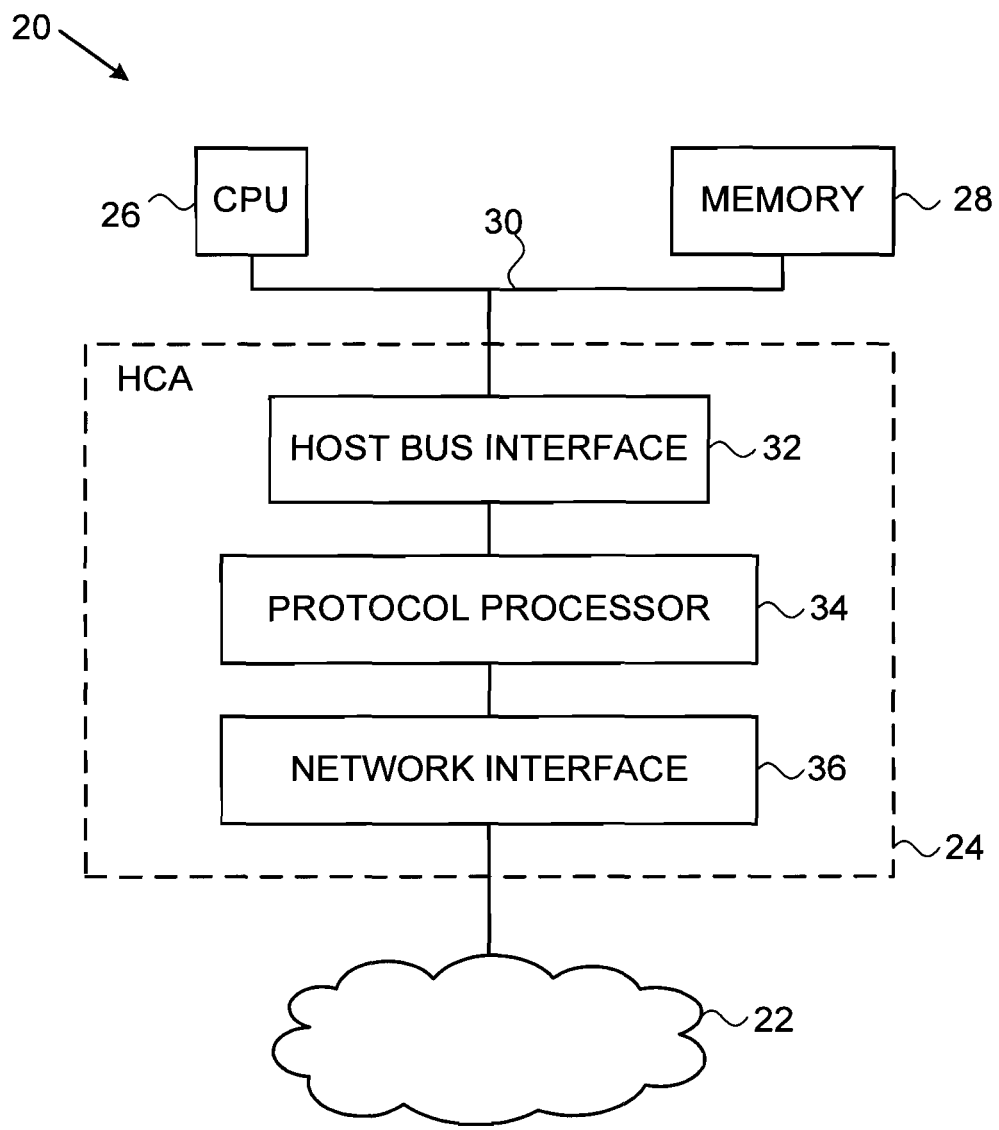
FIG. 1 is a block diagram that schematically illustrates a host computer with a host channel adapter (HCA), in accordance with an embodiment of the present invention.

Modern network interface controllers (NICs), such as IB HCAs and high-speed Ethernet adapters, are designed to write data to and read data from the host memory autonomously, thus relieving the host processor of involvement in many communication processing tasks. Such a NIC receives I/O work requests directly from software applications running on the host device, and performs memory read/write operations accordingly (generally using RDMA). For this purpose, it is important that the allocation of host memory for NIC read and write operations be coordinated with the overall memory management of the host device. In particular, it is desirable that the NIC support virtual memory addressing that is coordinated with host memory management, so that software applications can use virtual addresses in their I/O work requests. A scheme of this sort is described, for example, in the above-mentioned US 2010/0274876 and is applicable in the context of the embodiments described below.

Modern programming languages support dynamic memory allocation, which enables the programmer to allocate areas within a "heap" of host memory as needed for particular operations, and then to free the memory for other purposes when done. For example, programmers may use the "malloc" command in C or "new" in C++ for this purpose, thus providing more flexible, efficient use of memory resources. I/O devices that are known in the art, however, do not support such dynamic memory allocations. Programmers are therefore limited to using statically-allocated memory in their I/O work requests, whereby memory regions are assigned in advance by privileged, kernel-level operations carried out through the I/O device driver software that is associated with the host operating system.

Embodiments of the present invention that are described hereinbelow overcome these limitations by providing an I/O device that supports application-level dynamic memory registration. (The term "registration" is used, in the context of the present description and in the claims, to refer to assignment of memory for operations of an I/O device, in contrast to memory "allocation" that is carried out by software on the host device. The terms "memory assignment" and "memory registration" are used interchangeably in the present patent application.) This support for application-level dynamic memory registration is provided by hardware processing circuitry in the I/O device, which has multiple work queues (sometimes referred to as "rings," particularly in Ethernet systems) that are respectively assigned to various software applications. A single work queue can receive work requests from the respective application not only to perform I/O operations (such as RDMA read and write, as well as send operations), but also to register ranges of virtual addresses in the host memory for use in serving the application.

In other words, the application may post a first work request instructing the I/O device to dynamically register a certain virtual memory range (which is typically a part of a range that was initially pre-registered by a driver program). The application then posts a second work request instructing the I/O device to perform an I/O operation with respect to a specified address in the registered range. The processing circuitry executes these work requests and carries out the I/O operation accordingly. After the I/O operation has been completed, the application may post a further work request to invalidate the registration, and thus free the virtual memory range for subsequent re-use.

In the embodiments disclosed below, the processing circuitry translates the virtual addresses into physical addresses in order to access the host memory, using a memory translation table with a memory key provided in the work request submitted by the software application. The memory key may be direct or indirect. Direct memory keys are trusted entities, which point directly from virtual addresses to respective ranges of physical addresses in the host memory space. Indirect memory keys, on the other hand, point to one or more direct memory keys, thus mapping virtual addresses to other virtual addresses, and need not be trusted entities.

The use of an indirect memory key in this manner causes the I/O device to aggregate the multiple, respective address ranges of the corresponding direct memory keys into a single, virtually-contiguous memory segment, even when the corresponding ranges of the direct memory keys are mutually non-contiguous. This sort of indirection in memory registration is advantageous in that it permits the application software to specify only the single, virtually-contiguous range to be read from or written to in an I/O work request, using a single indirect memory key, rather than having to individually specify two or more separate segments using the corresponding direct keys.

Although the embodiments described below relate, for purposes of clarity, specifically to an IB HCA, the principles of the present invention are similarly applicable to other types of NICs with memory access capabilities, as well as to I/O devices of other sorts. Although the embodiments described herein use work queues for registering virtual address ranges or otherwise communicating with the host applications, the disclosed techniques are not limited to the use of work queues. In alternative embodiments, communication with the applications can be implemented using any other suitable mechanism, such as using a command interface that can be implemented, for example, by writing the commands into the device through its PCI memory bar. Furthermore, the principles of memory assignment and access that are described herein may be applied, mutatis mutandis, to other types of hardware devices that are connected to the host bus and access host memory.

System Description and Support for User-Mode Memory Registration

FIG. 1 is a block diagram that schematically shows components of a host computer 20, in accordance with an embodiment of the present invention. Computer 20 comprises an I/O device, such as an IB HCA 24, for communication with a packet network 22, such as an IB fabric or an Ethernet network, for example. The computer comprises a host processor 26, which typically comprises a general-purpose central processing unit (CPU), and a system memory 28, connected to the host processor by a host bus 30, under the control of a suitable memory controller (not shown), as is known in the art. The host processor typically runs an operating system and software applications. Memory 26 holds program instructions and application data, as well as metadata structures that are accessed and used by HCA 24 in managing data transfer operations. The host processor, memory and associated components are referred to collectively as a "host device."

HCA 24 is connected to bus 30 of the host computer by a host bus interface 32, comprising circuitry that enables the HCA to read and write data directly from and to memory 28. Network interface circuitry 36 in HCA 24 connects to network 22. Protocol processing circuitry 34 in the HCA performs transport-layer processing functions in accordance with instructions received from host processor 26. These functions include constructing data packets containing data gathered from memory 28 for transmission over network 22, as well as receiving and processing incoming packets from network 22 and scattering the data contained in the packets to memory 28. The functions of the HCA are typically implemented in dedicated hardware circuits, such as those described in the above-mentioned U.S. Patent Application Publication 2002/0152327.

Client processes running on computer 20 communicate with the transport layer of network 22 via HCA 24 by manipulating a transport service instance, known as a "queue pair" (QP), which is made up of a send work queue and a receive work queue. A given client may open and use multiple QPs simultaneously. To send and receive communications over network 22, the client process initiates work requests (WRs), which causes work items, referred to as work queue elements (WQEs), to be placed in the appropriate queues for execution by the HCA. Upon completion of a work item, the HCA writes completion queue elements (CQEs) to appropriate completion queues, which are then read by the client process as an indication that the WR in question has been completed.

Typically, a given channel adapter will serve multiple QPs concurrently, serving both as a requester—transmitting request messages and receiving responses on behalf of local clients—and as a responder—receiving request messages from other channel adapters and returning responses accordingly. Request messages include, inter alia, RDMA write and send requests, which cause the responder to write data to a memory address at its own end of the link, and RDMA read requests, which cause the responder to read data from a memory address and return it to the requester. RDMA read and write requests specify the memory range to be accessed by the HCA in the local memory of the responder, whereas send requests leave the choice of memory range to the responder. In the present embodiment, the memory range for at least some RDMA requests is assumed to be specified in terms of virtual memory addresses, which are translated by HCA 24 into machine addresses in memory 28, as described hereinbelow. For the sake of clarity and simplicity, the present description relates specifically in some cases to RDMA requests, but the techniques described herein are similarly applicable to other types of I/O requests that use virtual memory addresses.

Figure 2:
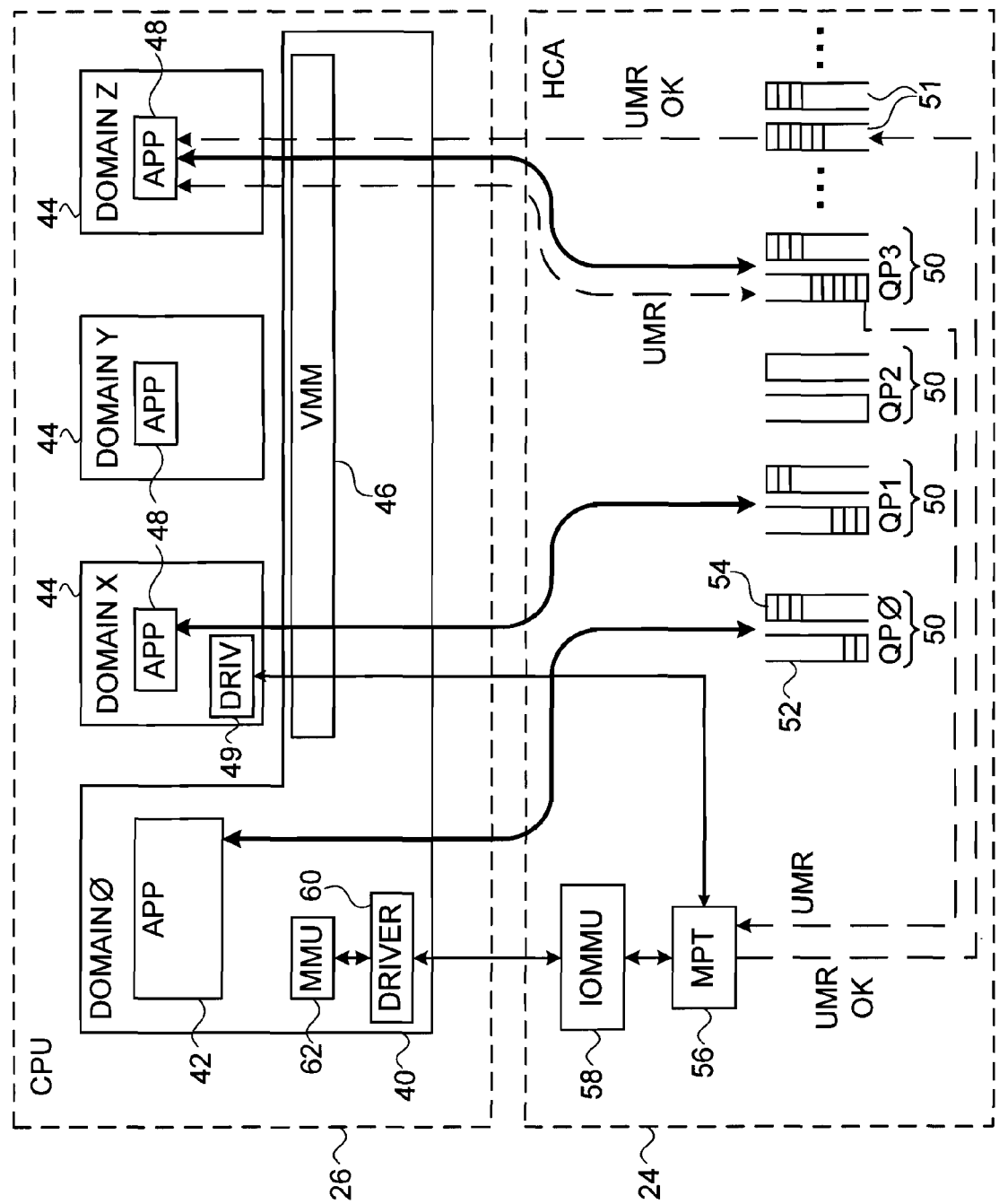
FIG. 2 is a block diagram that schematically shows functional details of interaction between host computer software and a HCA, in accordance with an embodiment of the present invention.

FIG. 2 is a block diagram that schematically shows functional details of interaction between HCA 24 and software running on CPU 26, in accordance with an embodiment of the present invention. In this embodiment, computer 20 is assumed to support a virtual machine environment, in which HCA 24 performs a multi-stage address translation process, as described hereinbelow. The address translation mechanisms implemented in HCA 24, however, including user-mode memory registration and address translation indirection, are likewise applicable to computers running any suitable sort of host operating system, with or without virtual machine support, as will be apparent to those skilled in the art.

CPU 26 operates a host domain 40 (referred to in the figure as DOMAIN 0), with a host operating system (not shown), which supports host applications 42. In addition, the CPU may concurrently run one or more virtual machines 44 (labeled DOMAIN X, DOMAIN Y, DOMAIN Z, . . . ), each with its own guest operating system and guest applications 48. A virtual machine monitor (VMM) 46 in the host domain (also referred to as a "hypervisor") interacts with the kernels of the guest operating systems in a manner that emulates the host processor and allows the virtual machines to share the resources of the CPU. A wide range of virtual machine software of this sort is available commercially, and further description is beyond the scope of the present invention.

For efficient use of HCA resources, both host domain 40 and virtual machines 44 are able to interact directly with HCA 24, rather than passing commands and data through the host domain. Thus, as shown in FIG. 2, each application 42, 48 may be assigned one or more queue pairs 50 (labeled QP0, QP1, . . . , in the figure), comprising a send queue 52 and a receive queue 54, as explained above. The applications also receive CQEs from HCA 24 via their assigned completion queues 51. Furthermore, each virtual machine 44 may post control and configuration commands to the HCA via a respective command queue (not shown). In other words, the HCA appears to each virtual machine to be a dedicated I/O device for use by that virtual machine. This configuration minimizes the burden on VMM 46 and on the host operating system.

Using the respective QPs 50, each virtual machine 44 is able to execute data flow operations directly between HCA 24 and memory 28. For this purpose, a HCA driver 49, which is associated with the guest operating system in each virtual machine 44 (although only one such driver is shown for simplicity), initially registers memory protection keys and virtual address spaces for use by respective QPs. This initial registration is a privileged operation, which is carried out via the operating system kernel. (Subsequently, applications 42, 48 may perform non-privileged, user-mode memory registration operations, as described below.) Driver 49 loads the keys and address translation tables into a memory protection and translation (MPT) unit 56, for use by the HCA in servicing work items in the QP. A HCA driver 60 in host domain 40 loads keys and address translation tables for use by host applications 42.

The address translation tables loaded into MPT unit 56 by the HCA drivers convert virtual addresses into physical addresses. In the case of driver 60 of the host domain, the physical addresses are actual machine addresses in memory 28. For virtual machines 44, however, these "physical addresses" are actually just another level of virtual addresses, defined in the virtual address space that is allocated to each virtual machine. The "physical addresses" in the virtual machine address spaces are translated by an I/O memory management unit (IOMMU) 58 into actual machine addresses in memory 28, which are used in writing to and reading from the memory via bus 30. Driver 60 loads the required address translation tables into IOMMU 58, based on the virtual memory spaces that have been allocated to each of the virtual machines.

For the sake of conceptual clarity, MPT unit 56 and IOMMU 58 are shown in FIG. 2 as separate entities. In practice, however, these two entities may be combined into a unified set of translation and protection tables, as illustrated below in FIG. 3. Alternatively, the functions of the IOMMU may be carried out by a separate unit, which may be located outside HCA 24 on bus 30 or as a part of CPU 26. The configuration shown in FIGS. 2 and 3, however, is advantageous in conserving system resources and enhancing the flexibility of the HCA.

The virtual memory space that is allocated in computer 20 to virtual machines 44 and to applications 42, 48 may exceed the actual amount of space available in memory 28. This sort of oversubscription may occur both in the allocation of memory to the virtual machines and in the allocation of this "virtual physical" memory among applications 48. A memory management unit (MMU) 62 therefore swaps pages of data into memory 28 when they are needed and out to mass storage (such as to disk) when they are not. Handling of page faults that may occur in this context is described in the above-mentioned US 2010/0274876.

Once drivers 49 and 60 have registered memory protection keys and virtual address spaces, applications 42 and 48 may allocate these regions for their own purposes and may control and change the address translations performed by MPT unit 56 in HCA 24 accordingly. In contrast to the initial, kernel-level memory registration, these application-level memory manipulations require no special permissions, and they are therefore referred to herein as user-mode memory registration (UMR) operations. Because they require no kernel calls, UMR operations generally execute quickly on CPU 26 and make it easier for the application programmer to register and re-register virtual memory for I/O operations. This ease of use is further enhanced by UMR support for indirect memory registration, which allows a number of separate virtual memory segments to be combined transparently into a single, virtually-contiguous region, as explained below.

Applications 42, 48 register virtual memory regions using UMR in the same manner as they send and receive data packets: by writing a work request to send queue 52 of their allocated QP 50. This message flow is shown in FIG. 2 with respect to application 48 running in "DOMAIN Z." The UMR work request may have the same general format as a SEND or WRITE work request, for example, but contains an operation code identifying it as a UMR request and a payload indicating the memory key(s) and region(s) to be registered, along with any necessary control information.

When the WQE corresponding to the UMR work request reaches the head of queue 52, HCA 24 recognizes and passes it to MPT unit 56 for execution. The MPT unit checks that memory region and access rights requested in the UMR work request are in accordance with the memory regions and rights that were originally registered to driver 49 and do not conflict with other, existing registrations. Upon completing these checks successfully, MPT unit 56 acknowledges the new memory registration by writing a suitable CQE to completion queue 51. In the event of an access violation, however, MPT unit 56 will send a failure notification to the application.

Upon receiving the CQE, application 48 may proceed to submit one or more work requests to send or receive data from or to the registered virtual memory region, using local or remote memory access. When these data operations are completed, application 48 may submit an invalidation work request, to invalidate the memory key that it has used and free the corresponding memory region(s) for other users.

Address Translation with Indirection

Figure 3:
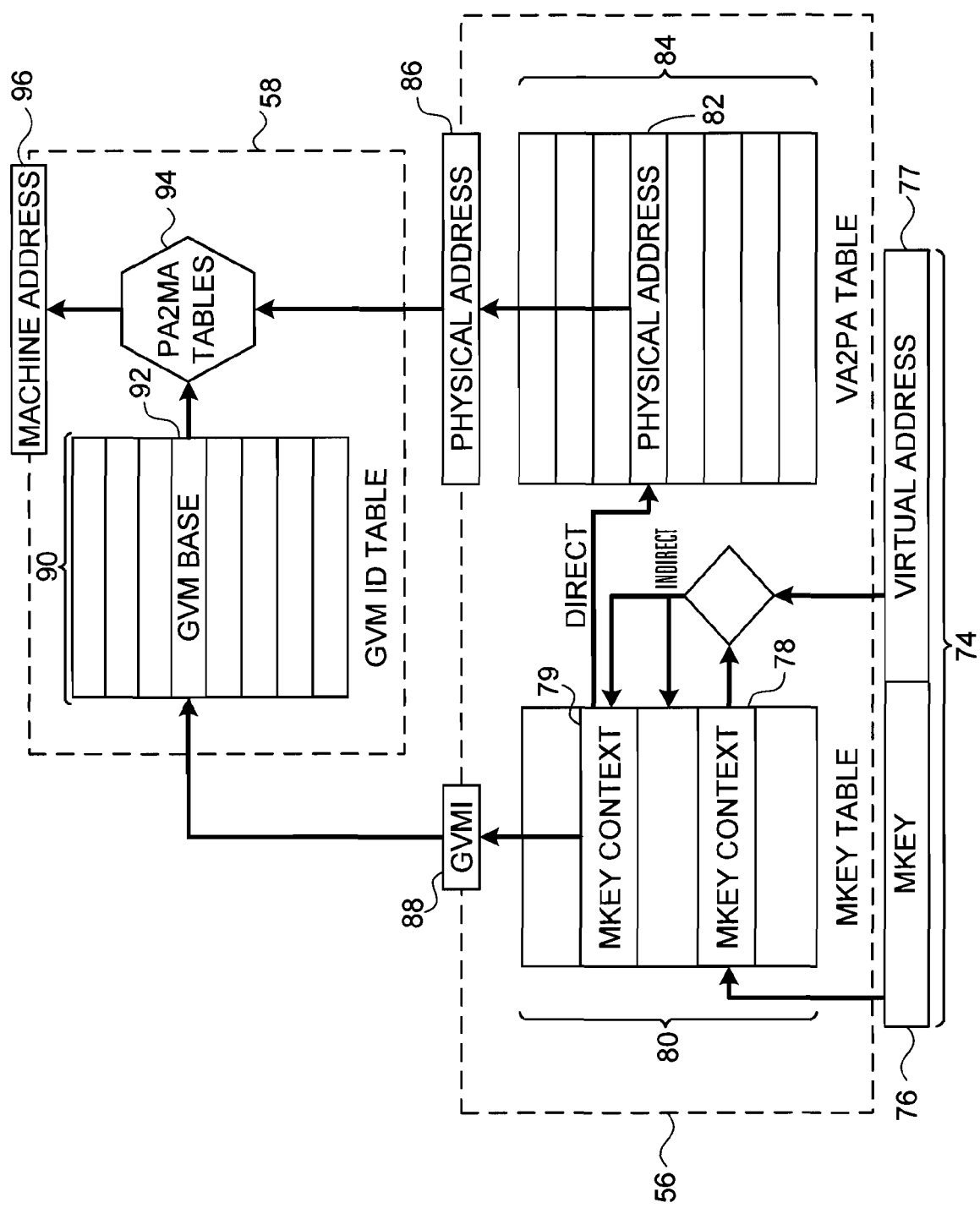
FIG. 3 is a block diagram that schematically illustrates memory translation and protection tables, in accordance with an embodiment of the present invention.

FIG. 3 is a block diagram that schematically illustrates the operation of translation and protection tables in HCA 24, in accordance with an embodiment of the present invention. The figure illustrates a multi-stage translation process, which is carried out in MPT unit 56 and IOMMU 58. The process may be carried out by processing circuitry within host bus interface 32 of HCA 24 or within protocol processor 34. Both of these elements of the HCA may be considered a part of the packet processing hardware circuitry for the purposes of the present description and claims.

As noted above, WQEs serviced by HCA 24 on a given QP (including UMR WQEs) specify locations in memory 28 by means of an access address 74 comprising a memory key (MKey) 76 and a virtual address 77. The memory key points to a MKey context 78, 79 in a memory protection table 80. This context serves (at least) two purposes:

It provides the base address for use in the next look-up stage, leading ultimately to a corresponding physical address entry 82 in a memory translation table 84.

It provides a guest virtual machine identifier (GVMI) 88 for use by IOMMU 58.

Tables 80 and 84 are provided in MPT unit 56 for each virtual machine 44 and are written to HCA 24 initially by the driver 49 in that virtual machine. Thus, a "physical address" 86 that is output by table 84 for a QP of a virtual machine is not actually a machine address in memory 28, but is rather a virtual address in the address space of that virtual machine, as explained above. The exception to this generalization is for QPs assigned to host domain 40, for which physical address 86 is a machine address. (The host domain typically has its own GVMI, which is commonly set to zero.)

IOMMU 58 comprises an address translation section, as shown in FIG. 3, as well as an attribute translation section (not shown). The functions of these sections are typically (although not necessarily) turned on for QPs belonging to virtual machines 44 and off for QPs belonging to host domain 40. For a given virtual machine, GVMI 88 serves as a key to extract a base address 92 from a GVM identifier table 90. This base address is used in looking up a machine address 96 that corresponds to physical address 86 in physical-to-machine address (PA2MA) tables 94. Tables 90 and 94 are written by driver 60 of host domain 40.

MKey contexts 78, 79 specify, for the corresponding MKey 76, the start address and length of the corresponding region in virtual memory, as well as various items of metadata. In an embodiment of the present invention, these metadata include an "indirect" flag, indicating that the MKey in question is configured for indirect addressing. In conventional, direct addressing, MKey context 79 points directly to physical address 82, which serves as the base address for translation of virtual address 77. In indirect addressing, MKey context 78 points to one or more other MKeys, i.e., an additional layer of virtualization is provided. Thus, upon encountering an indirect MKey in access address 74, MPT unit 56 first looks up the MKey (or MKeys) indicated by MKey context 78 and then uses the context of these latter MKeys along with virtual address 77 in address translation to find physical address 82, as illustrated in FIG. 3.

This sort of indirect memory registration and lookup is particularly convenient when used in conjunction with UMR, as it facilitates safe, flexible application-level memory registration. It may similarly be used, however, in kernel-mode (protected) memory registration schemes. Although only a single level of MKey indirection is shown in the figures, indirect MKeys may alternatively point to other indirect MKeys, leading to multiple corresponding stages of address translation.

Figure 4:
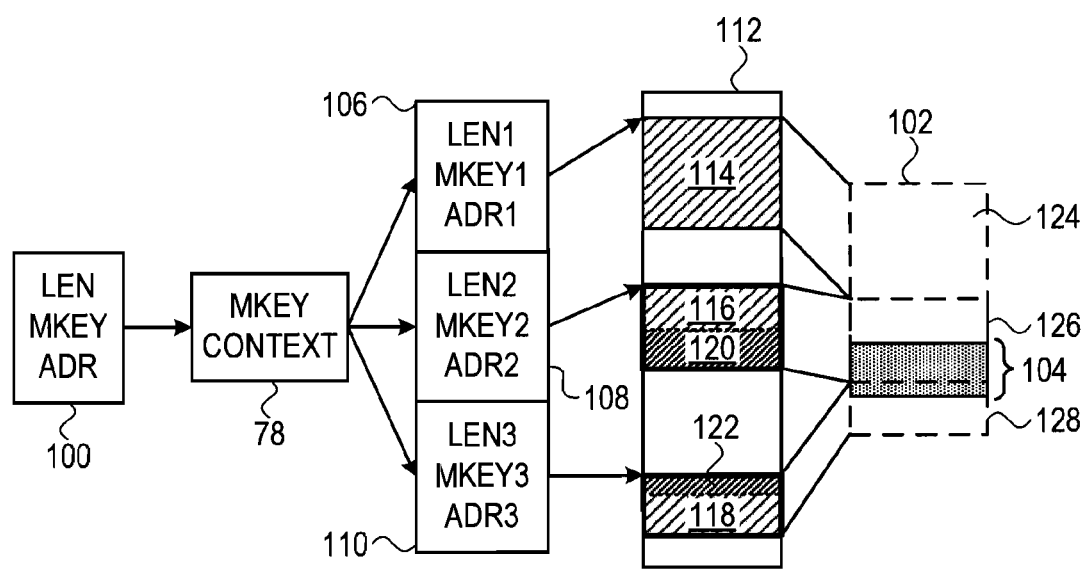
FIG. 4 is a block diagram that schematically illustrates memory translation operations, in accordance with an embodiment of the present invention.

FIG. 4 is a block diagram that schematically illustrates memory translation operations carried out by MPT unit 56, in accordance with an embodiment of the present invention. These operations are initiated when MPT unit 56 receives a memory reference 100. Such references may reach the MPT unit, for example, either in WQEs submitted by applications 42, 48 or in packets received from network 22. Reference 100 comprises a MKey, base address (ADR) and length (LEN), which together specify a virtual memory segment 104 to which reference 100 refers within a corresponding virtually-contiguous memory region 102.

MPT unit 56 looks up MKey context 78 in table 80 for the MKey indicated in reference 100. In the example shown in FIG. 4, context 78 indicates that the MKey in question is indirect and contains pointers 106, 108 and 110 to three other memory references, each with its own MKey, base address and length. These pointers point to respective segments 114, 116 and 118 in a virtual memory space 112 of host memory 28. As shown in FIG. 4, these segments need not be mutually contiguous.

With respect to the MKey of memory reference 100, however, MPT unit 56 treats the corresponding region 102 as though it were contiguous. In other words, in performing address translation in response to reference 100, the MPT unit relates to segments 114, 116 and 118 as though they were contiguous segments 124, 126 and 128 of region 102. For purposes of this translation, if the base address of segment 128 is X, then the base address of segment 126 will be X+LEN3, and the base address of segment 124 will be X+LEN3+LEN2.

Virtual memory segment 104 crosses the border between segments 128 and 126: A lower part 122 of segment 104 is actually within segment 118 in memory space 112, while a remaining, upper part 120 is in segment 116. In passing the memory reference to IOMMU 58, MPT unit 56 will therefore instruct the IOMMU that two separate memory access operations are needed in order to reach both lower and upper parts 122 and 120. This separation, however, is transparent to the entity that submitted reference 100. Thus, applications 48, for example, may use indirect MKeys to specify an I/O operation over a single, virtually-contiguous address range in memory 28, even when the corresponding virtual and physical address ranges that are allocated for the operation are fragmented. The application programmer can use this capability to avoid the difficulty and possible errors that may be involved in providing a scatter or gather list that specifies all the memory segments explicitly.

Although the embodiments described above use IB network conventions and interface devices, the principles of the present invention may similarly be applied to I/O devices of other sorts, using other network standards, protocols, and conventions. For example, the devices and methods described above may be applied, mutatis mutandis, in data transmission over Ethernet networks, and particularly in implementation of RDMA protocols over such networks. The implementation may be based on IB protocols and specifications, as described above, or it may alternatively be based on other protocols that are known in the art, particularly protocols that allow direct access to the I/O device by user-level application protocols, as illustrated in FIG. 2. Alternatively, aspects of the present invention may be adapted for use with kernel-level protocols, such as the well-known Transport Control Protocol (TCP).

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An input/output (I/O) device, comprising:
   a host interface for connection to a host device having a memory;
   a network interface, which is configured to transmit and receive, over a network, data packets associated with I/O operations directed to specified virtual addresses in the memory; and
   processing circuitry, which is configured to translate the virtual addresses into physical addresses using memory keys provided in conjunction with the I/O operations and to perform the I/O operations by accessing the physical addresses in the memory,
   wherein at least one of the memory keys is an indirect memory key, which points to multiple direct memory keys, corresponding to multiple respective ranges of the virtual addresses, such that an I/O operation referencing the indirect memory key can cause the processing circuitry to access the memory in at least two of the multiple respective ranges.

2. The device according to claim 1, wherein the processing circuitry is configured to translate the virtual addresses into the physical addresses by accessing a translation table using the memory keys.

3. The device according to claim 1, wherein the multiple respective ranges are mutually non-contiguous.

4. The device according to claim 3, wherein the I/O operation referencing the indirect memory key contains a reference to a single contiguous memory segment at a specified address, and
   wherein the processing circuitry is configured, using the memory keys, to translate the reference so as to identify and access respective segments of the memory in at least two of the mutually non-contiguous ranges in performing the I/O operation.

5. The device according to claim 1, wherein the memory keys comprise a further indirect memory key, which points to one or more other indirect memory keys.

6. The device according to claim 1, wherein the processing circuitry has multiple work queues, which are respectively assigned to software applications and which comprise at least one work queue that is configured to receive from a respective software application at least:

a first work request instructing the I/O device to register a range of virtual addresses in the memory for use in serving the respective software application; and a second work request instructing the I/O device to perform the I/O operation with respect to a specified address in the registered range, and wherein the processing circuitry is configured to execute the work requests so as to cause the network interface to transmit and receive over the network data packets associated with the I/O operation.

7. The device according to claim 6, wherein the software application is configured to run on a virtual machine in a guest domain on the host device, and wherein the physical addresses belong to the guest domain, and wherein the processing circuitry is configured to translate the physical addresses belonging to the guest domain into machine addresses for use in accessing the memory.

8. The device according to claim 6, wherein the processing circuitry is configured to translate the virtual addresses into the physical addresses using a translation table, and wherein the first work request provides a memory key for accessing the translation table.

9. The device according to claim 6, wherein the processing circuitry is configured to return a completion queue element to the respective software application to indicate that the range of the virtual addresses has been registered in response to the first work request.

10. The device according to claim 6, wherein the I/O operation invoked by the second work request comprises a remote direct memory access (RDMA) operation.

11. The device according to claim 1, wherein the direct memory keys are registered on the I/O device by a driver program associated with an operating system on the host device, and wherein the indirect memory keys are registered by software applications.

12. A method for communication, comprising:

coupling an input/output (I/O) device to transmit and receive, over a network, data packets associated with I/O operations directed to specified virtual addresses in a memory of a host device that is coupled to the I/O device;

receiving in the I/O device memory keys, wherein at least one of the memory keys is an indirect memory key, which points to multiple direct memory keys, which are associated with respective ranges of the virtual addresses;

translating, in the I/O device, the specified virtual addresses into physical addresses using the memory keys; and performing an I/O operation referencing the indirect memory key by accessing the physical addresses in the memory corresponding to at least two of the respective ranges of the virtual addresses that are associated with the direct memory keys that are pointed to by the indirect memory key.

13. The method according to claim 12, wherein the specified virtual addresses are translated into the physical addresses by accessing a translation table using the memory keys.

14. The method according to claim 12, wherein the multiple respective ranges are mutually non-contiguous.

15. The method according to claim 14, wherein the I/O operation referencing the indirect memory key contains a reference to a single contiguous memory segment at a specified address, and wherein translating the specified virtual addresses comprises translating the reference so as to identify and access respective segments of the memory in at least two of the mutually non-contiguous ranges in performing the I/O operation.

16. The method according to claim 12, wherein the memory keys comprise a further indirect memory key, which points to one or more other indirect memory keys.

17. The method according to claim 12, and comprising:

respectively assigning multiple work queues in the I/O device to software applications running over an operating system on the host device;

receiving in at least one work queue of the I/O device, from a respective software application, at least:

a first work request instructing the I/O device to register a range of virtual addresses in a memory of the host device for use by the respective software application; and a second work request instructing the I/O device to perform the I/O operation with respect to a specified address in the registered range; and executing the work requests in the single work queue so as to cause the I/O device to transmit and receive over the network data packets associated with the I/O operation.

18. The method according to claim 17, wherein the software application is configured to run on a virtual machine in a guest domain on the host device, and wherein the physical addresses belong to the guest domain, and wherein translating the virtual addresses comprises translating the physical addresses belonging to the guest domain into machine addresses for use in accessing the memory.

19. The method according to claim 17, wherein the virtual addresses are translated into the physical addresses using a translation table, and wherein the first work request provides a memory key for accessing the translation table.

20. The method according to claim 17, wherein executing the work requests comprises returning a completion queue element to the respective software application to indicate that the range of the virtual addresses has been registered in response to the first work request.

21. The method according to claim 17, wherein executing the work requests comprises executing a remote direct memory access (RDMA) operation responsively to the second work request.

22. The method according to claim 12, wherein the direct memory keys are registered on the I/O device by a driver program associated with an operating system on the host device, and wherein the indirect memory keys are registered by software applications.

* * * * *